MONOPLANE.
APPLICATION FILED MAY 17, 1911.
1,025,912.
Patented May 7, 1912.
2 SHEETS—SHEET 2.
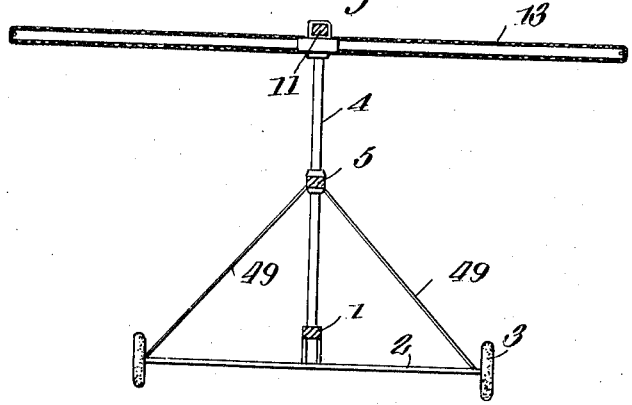
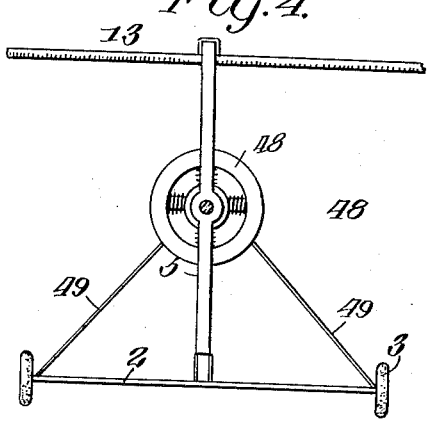
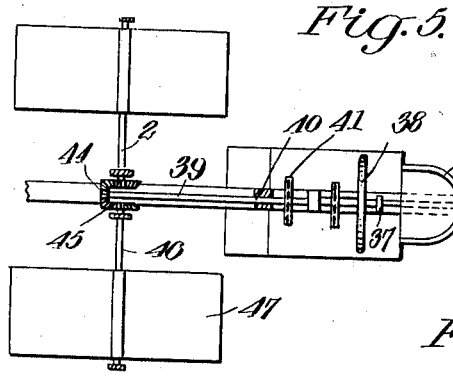
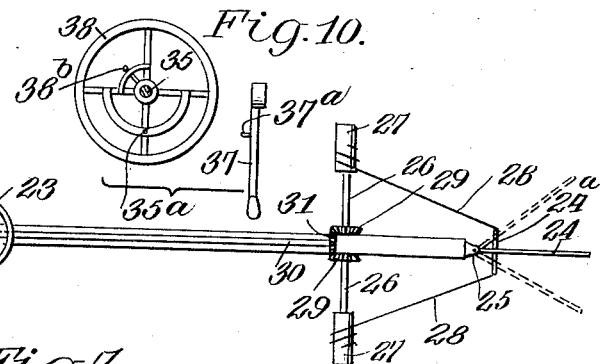
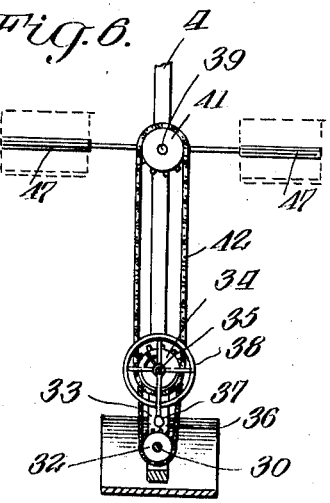
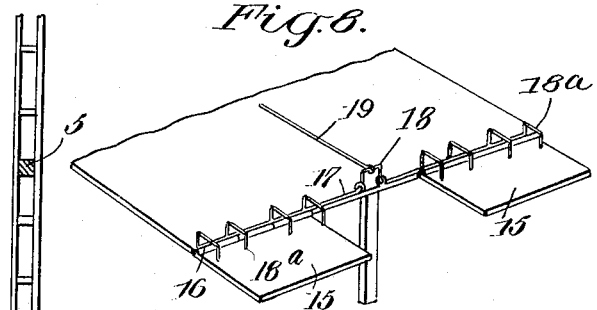
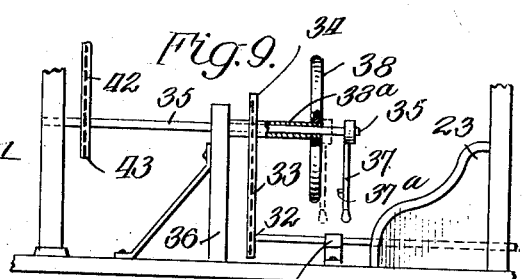
WITNESSES
Samuel E. Wade.
INVENTOR
ROBERT H. HAAG.
BY
ATTORNEYS

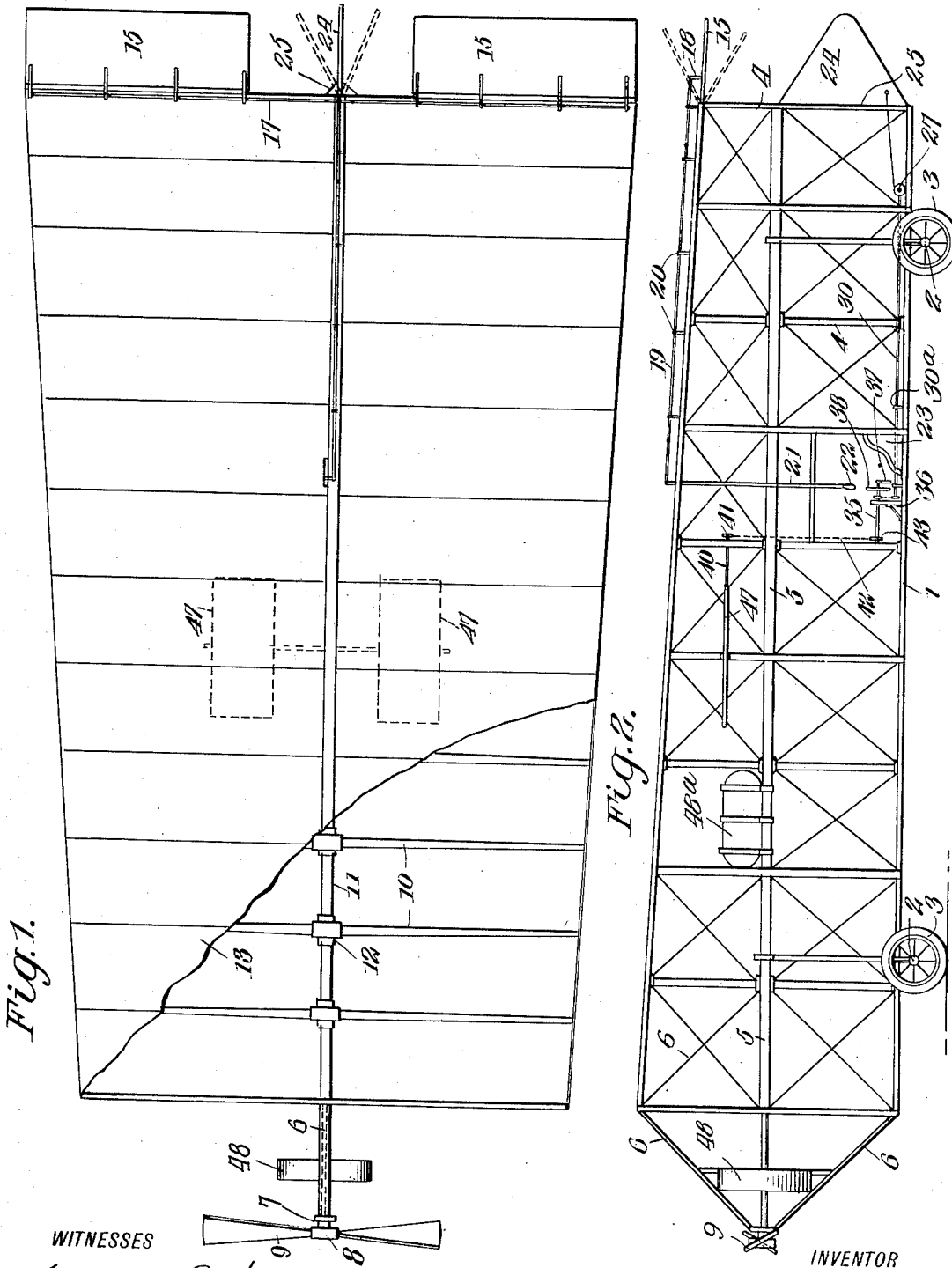

UNITED STATES PATENT OFFICE.

ROBERT H. HAAG, OF LOUISVILLE, KENTUCKY.

MONOPLANE.

1,025,912.  Specification of Letters Patent.  Patented May 7, 1912.

Application filed May 17, 1911. Serial No. 627,726.

*To all whom it may concern:*

Be it known that I, ROBERT H. HAAG, a citizen of the United States, and a resident of Louisville, county of Jefferson, and State of Kentucky, have invented certain new and useful Improvements in Monoplanes, of which the following is a specification.

My invention is an improvement in monoplanes, and consists in certain novel constructions and combinations of parts hereinafter described and claimed.

Referring to the drawings forming part hereof, Figure 1 is a plan view of the improvement partly broken away. Fig. 2 is a side view. Fig. 3 is a transverse vertical section. Fig. 4 is a front view. Fig. 5 is a detail plan view of the controlling mechanism. Fig. 6 is a front view of Fig. 5. Fig. 7 is an enlarged sectional view of the plane. Fig. 8 is a perspective view of the rear end of the plane. Fig. 9 is a side view of the seat and the operating mechanism, and, Fig. 10 is a detail view of a portion of the controlling mechanism.

The present embodiment of the invention comprises a rod or bar 1, which is provided near each end with a transverse shaft or axle 2, and a wheel 3, preferably rubber tired, is journaled on each end of each axle. The bar is provided at spaced intervals with vertical standards or uprights 4, and the said standards or uprights are connected at approximately their centers by a hollow bar or housing 5. The bar or housing 5 extends approximately flush with the end of the bar 1 at the front of the machine, and is braced against the bar 1 and the plane to be described later, in detail, by braces 6.

A shaft 7 is journaled in the housing 5, and the forward end of the shaft is provided with a propeller comprising a hub 8 and radial, spirally arranged blades 9. A plane is supported by the uprights, the said plane comprising cross bars 10 connected by a longitudinal bar 11, at their centers, and a covering 13 which is arranged both above and below said bars.

A horizontal rudder 15 is arranged at each side of the plane at the rear end thereof, and it will be noticed that the said plane is somewhat wider at its rear than at its front end. The rudders 15 are hinged to the rear cross bar of the plane at 16, and a shaft 17 is journaled transversely of the plane at the said rear end. The shaft is provided at its center with a crank arm 18, and on each side of its center with a plurality of arms 18ª, each of which extends upwardly at right angles to the shaft, and thence rearwardly, and downwardly to a connection with the upper face of the adjacent rudder. A link 19 is pivoted to the crank arm 18 and extends forwardly through bearing brackets 20 on the plane to a connection with a vertical link 21, which is provided with a handle 22 adjacent to the seat 23 arranged on the bar 1. It will be evident that the rudder 15 may be swung as indicated in dotted lines in Fig. 2, by means of the link 21. A vertical rudder 24, substantially triangular in shape, is hinged at 25 to the rear upright 4. A pair of alined shafts 26 is journaled transversely of the bar 1 adjacent to the rudder, and a roller 27 is secured on each shaft at its outer end. A cord 28 is secured to each end of a cross bar 24ª on the rudder, and each cord winds upon the adjacent roller 27. The inner end of each shaft is provided with a beveled gear 29, which meshes with a similar gear 31 on a shaft 30 journaled in bearings 30ª on the bar 1. The shaft 30 extends beneath the seat 23 and is provided at its forward end with a sprocket wheel 32 connected by a chain 33 with a sprocket wheel 34 loose on a shaft 35 journaled in brackets 36 on the bar 1. The shaft 35 is provided with a handle 37 for oscillating the same, and a hand wheel 38 is provided with a hub 38ª encircling the shaft and the sprocket wheel 34 is secured to the said hub.

It will be evident that by turning the hand wheel 38, the rudder 24 may be swung in either direction to steer the plane to the right or to the left, and without interfering with the shaft 35. The handle 37 is slidable on a feather on the shaft 35, and is provided with a pin 37ª for engaging an opening 35ª in the hand wheel 38, to prevent rotation of the said wheel. The spark controlling lever 38ᵇ is also arranged on the wheel 38, as shown in Fig. 10, in order to have the said lever in a convenient position for the operator.

A shaft 39 is journaled in bearing brackets 40 on the uprights 4, and the said shaft is provided at its rear end with a sprocket wheel 41 connected by a sprocket chain 42 with a sprocket wheel 43 on the shaft 35 before mentioned. The opposite end of the shaft 39 is provided with a beveled gear wheel 44, meshing on each side with a bevel gear 45. The gears 45 are on the inner ends of alined shafts 46, each of which is provided at its outer end with a transversely arranged wing or aileron 47.

It will be evident that when the shaft 39 is oscillated by means of the handle 37, the ailerons may be moved to balance the plane or to steer the same, and the said shaft may be locked by engaging the pin 37ª of the handle 37 with the opening 35ª on the wheel 38.

A motor 48 of any usual or desired construction is supported on the housing 5, and is connected with the propeller shaft 7 to operate the propeller 8—9. A gasolene tank 49 is supported in rear of the motor.

It will be evident that all of the controlling mechanism is convenient to the seat 23. By means of the handle 37, the ailerons may be controlled, and by means of the link 21, the horizontal rudder 15 may be operated. The hand wheel 38 operates the rudder 24, and the spark lever 38ᵇ is supported on the hand wheel. The axles 2 are braced against the housing 5 by means of braces 49, and it will be evident that a second plane might be connected with the bar 1, if found advisable.

The device as a whole, while simple, is strongly constructed, easily guided, and the weight is arranged below the supporting surface, so that the stability of the device is aided to a great extent.

The bars forming the device are preferably of spruce, and the covering for the planes is of rubber-treated silk. The motor is shown inclosed by a housing, the said housing being preferably of aluminum.

I claim:—

1. A device of the character specified, comprising a supporting plane, said plane being of greater width at its rear than at its front and having its side edges tapering, a horizontal rudder at each side of the rear end, a shaft journaled transversely of the said rear end and provided at its center with a crank arm, said shaft having a plurality of rearwardly extending arms near each end thereof, each of the said arms extending upwardly, rearwardly, and downwardly to a connection with the upper face of the adjacent rudder, and means connected with the crank arm for operating the rudders.

2. In a device of the character specified, a supporting plane, said plane being of greater width at its rear than at its front end, an aileron on each side of the longitudinal center of the plane, and journaled for swinging movement on an axis transverse to the supporting plane, means for swinging the ailerons, a horizontal rudder at each side of the rear end, a shaft journaled transversely of the plane and provided at its center with a crank arm, said shaft having a plurality of rearwardly extending arms near each end thereof, each of the said arms extending upwardly and rearwardly and downwardly to a connection with the adjacent rudder, and means connected with the crank arm for operating the rudders.

3. In a device of the character specified, a supporting plane, a horizontal rudder at each side of the rear end, a shaft journaled transversely of the plane and provided at its center with a crank arm, said shaft having a plurality of rearwardly extending arms near each end thereof, each of the said arms extending upwardly and rearwardly and downwardly to a connection with the adjacent rudder, and means connected with the crank arm for operating the rudders.

4. In a device of the character specified, a supporting plane, a vertical rudder supported below the plane and at the rear thereof, a pair of alined rollers in front of the rudder, a cord connected with each face of the rudder and winding on the adjacent roller, a shaft journaled longitudinally of the plane between the rollers and having a driving connection with the said rollers for simultaneously rotating them in opposite directions, a countershaft journaled above the said shaft, a sleeve journaled on the countershaft and provided with a hand wheel, a connection between the sleeve and the first-named shaft for operating the same, an aileron near each side of the plane at approximately the longitudinal center thereof, a shaft secured to each aileron, said shafts being in alinement, an operating shaft arranged longitudinally of the plane and having a driving connection with the shafts of the ailerons for simultaneously moving them in opposite directions, a connection between the operating shaft and the countershaft, a handle secured to the countershaft, and means for locking the handle to the hand wheel.

ROBT. H. HAAG.

Witnesses:
W. C. JONES,
PARKER S. TERRY.